E. K. & J. M. BRUCE,

Assignors to E. M. LANG.

Apparatus for Sealing Fruit-Can.

No. 9,025. Reissued Jan. 6, 1880.

Witnesses,

W. A. Bertram.

Dr. L. H. Barclay.

Inventors,

— E. K. BRUCE —

— J. M. BRUCE — by

R. D. Williams.

Attorney.

UNITED STATES PATENT OFFICE.

ELGIN K. BRUCE, OF KEOKUK COUNTY, IOWA, AND JOHN M. BRUCE, OF PITTSBURG, PENNSYLVANIA, ASSIGNORS TO EDWARD M. LANG, OF PORTLAND, MAINE.

APPARATUS FOR SEALING FRUIT-CANS.

SPECIFICATION forming part of Reissued Letters Patent No. 9,025, dated January 6, 1880.

Original No. 59,816, dated November 20, 1866. Application for Reissue filed December 4, 1879.

*To all whom it may concern:*

Be it known that we, ELGIN K. BRUCE, of Keokuk county, State of Iowa, and JOHN M. BRUCE, of Pittsburg, Allegheny county, State of Pennsylvania, (both formerly of Wilkins, Allegheny county, State of Pennsylvania,) have invented certain new and useful Improvements in Apparatus for Sealing or Cementing Cans; and we hereby declare the same to be fully, clearly, and exactly described as follows, reference being had to the accompanying drawings, in which—

Figure 1:
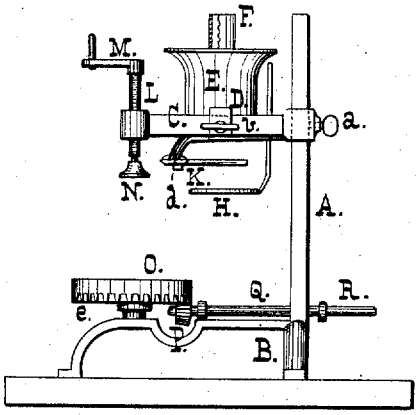
Figure 2:
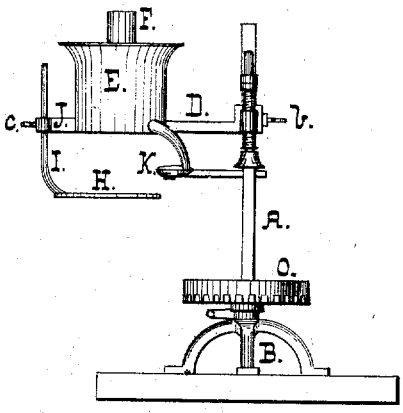
Figure 3:
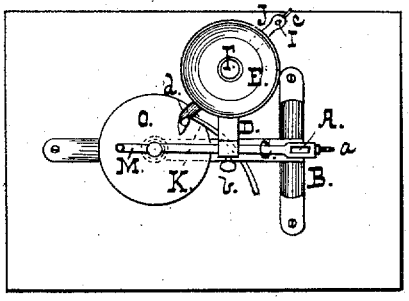
Figure 4:
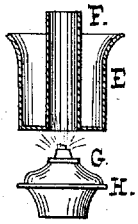

Figures 1 and 2 are side elevations of the device; Fig. 3, a top or plan view of the same; Fig. 4, a vertical central sectional view of the cement-vessel pertaining to the same.

This invention relates to a new and useful device for sealing or cementing cans, designed more especially for sealing or cementing fruit-cans.

The object of the invention is to obtain a device by which the work may be rapidly and perfectly performed and with great facility.

The invention consists, substantially, of an upright provided with a horizontal adjustable or sliding beam having a clamp at one end and a sliding or adjustable arm fitted upon it, which supports the cement-vessel, the latter having a discharge-spout and valve, and also provided with a tube, which passes through its center and serves as a chimney for a lamp, which keeps the cement in a warm fluid state. A rotating table or disk is also arranged at the lower part of the device, on which the can to be sealed is placed, all being arranged in such a manner that the can may be placed on the rotating table or disk, the cover secured on the can by the clamp, the can then rotated by turning the table, and the warm or liquid cement allowed to pass from the vessel into the groove in the top of the can made to receive it.

One of the features of our invention consists in the revolving table and cap-holder for maintaining the cap or cover securely in place upon the can pending the operation of sealing.

A represents an upright bar, which is supported by a suitable base or framing, B, and C is a horizontal bar, one end of which is fitted on the upright bar A so that it may slide freely thereon. This bar C is secured at any desired point on the upright bar A by means of a set-screw, *a*.

D is a horizontal arm, one end of which is fitted on the horizontal bar C so that it may slide thereon, and is secured at any desired point on said bar C by a set-screw, *b*. On the opposite end of this arm D a vessel, E, is secured, to hold or contain the cement, said vessel having a tube, F, fitted centrally in it to serve as a draft-chimney for a lamp, G, which is fitted in a ring-support, H, at the lower end of a rod, I, the latter passing loosely through a bracket, J, on arm D, in which a set-screw, *c*, passes to hold the rod I.

The cement-vessel E has a tube, *d*, projecting from it, and a valve, K, is secured to said tube, by which the end of the latter may be opened or closed when desired, and in the outer end of the bar C there is fitted a vertical screw, L, having a crank, M, at its upper end and a revolving or swiveled disk, N, at its lower end.

O represents a circular table or disk having pendent teeth *e* at its outer edge, into which a pinion, P, gears, said pinion being on a shaft, Q, having a crank, R, at its outer end. This table or disk O and shaft Q have their bearings in the framing or base B, and the center of the table or disk O is in line with the screw L.

The operation is as follows: The vessel E is supplied with the cement, the lamp G lighted and placed in its support H, the cement being quickly warmed or heated in consequence of the draft-chimney F passing through the cement-vessel. The can is placed on the table or disk O, the bar C being adjusted higher or lower to suit the height of the can, and the screw L turned until the disk N presses firmly upon the lid of the can and holds it in place. The arm D is then adjusted on bar C so as to bring the end of the tube *d* over the groove in the top of the can designed to receive the cement. The can is then rotated by turning shaft Q, the valve K opened, and the warm liquid cement passes into the groove in the can and seals it, the rotation of the can, of course, insuring the groove being filled properly all around. The valve K is then closed, which stops the flow of the cement from E, the sealed can removed from the table or disk, and the operation repeated.

What we claim as new, and desire to secure by Letters Patent, is—

1. In an apparatus for sealing cans, a revolving table or disk, in combination with a holder for maintaining the cover or cap in place during the operation of sealing, substantially as set forth.

2. In an apparatus for sealing cans, a revolving table or disk, in combination with a holder for maintaining the cover or cap in place, the said holder being adjustable to or from the disk, and situated in the axis of its rotation, as set forth.

3. In an apparatus for sealing cans, a revolving disk or table, in combination with a cap-holder having a swiveling tip, whereby the cover or cap is maintained in place on the can and both are permitted to revolve freely, as set forth.

4. The combination, in an apparatus for sealing cans, of a revolving table or disk, a cap-holder, and a vessel adapted to hold and to feed the sealing material, as set forth.

5. The cement-vessel E, provided with a discharge opening or tube, with a cut-off or valve, K, in combination with a rotary table or disk, O, on which the can to be sealed is placed, and an adjustable clamp for holding the lid or cover on the can while the latter is being sealed, substantially as shown and described.

6. The adjustable bar C, fitted on the upright bar A, in connection with the adjustable arm D, placed on the bar C, all arranged as shown, to admit of the proper adjustment of the cement-vessel to the can to be sealed, as set forth.

7. The cement-vessel E, having the central tube, F, in combination with the lamp G, fitted in an adjustable support, H, and with the rotary table or disk O and clamp, for the purpose set forth.

ELGIN K. BRUCE.
JOHN M. BRUCE.

Witnesses to signature of Elgin K. Bruce:
S. A. JAMES,
GEO. S. JAMES.

Witnesses to signature of John M. Bruce:
D. C. REARDON,
JAMES H. PORTE.